Figure 2:
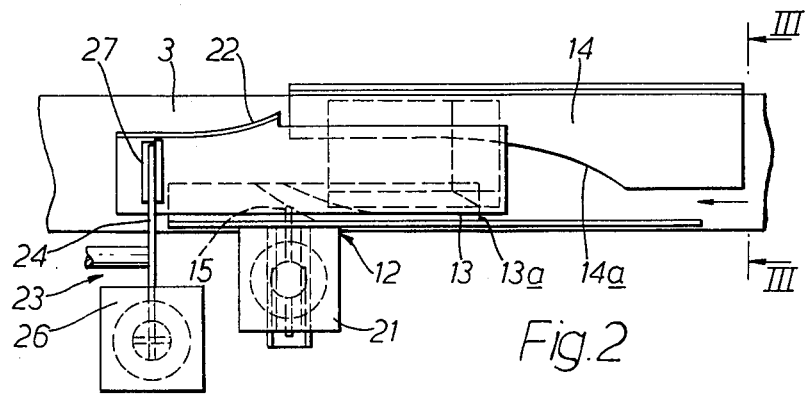

United States Patent [19]

Carter et al.

[11] 4,274,530

[45] Jun. 23, 1981

[54] PACKET HANDLING APPARATUS

[75] Inventors: David C. M. Carter; George C. Leigh; Barry G. Applegate; Robert J. Green, all of London; Martin D. Morgan, Great Brickhill, Nr. Milton Keynes, all of England

[73] Assignee: Molins Limited, London, England

[21] Appl. No.: 56,255

[22] Filed: Jul. 10, 1979

[30] Foreign Application Priority Data

Jul. 10, 1978 [GB] United Kingdom ............... 29318/78

[51] Int. Cl.³ ...................... B65G 47/57; B65G 47/31
[52] U.S. Cl. .................................... 198/347; 198/461
[58] Field of Search ............. 198/347, 416, 417, 425, 198/426, 461, 491; 193/46, 47, 48

[56] References Cited

U.S. PATENT DOCUMENTS

| 1,190,235 | 7/1916 | Ayars | 198/417 |
| 2,558,774 | 7/1951 | Nordquist | 198/416 |
| 3,340,992 | 9/1967 | Seragnoli | 198/347 |
| 3,342,350 | 9/1967 | Seragnoli | 198/347 X |
| 3,470,996 | 10/1969 | Lee et al. | 198/347 |
| 3,499,555 | 3/1970 | Wahle | 198/347 X |
| 3,976,190 | 8/1976 | Schmermund | 198/347 |
| 4,130,193 | 12/1978 | Bourgeois | 198/425 X |
| 4,190,146 | 2/1980 | Knuchel | 198/461 X |

FOREIGN PATENT DOCUMENTS 2640867 3/1977 Fed. Rep. of Germany ........... 198/347

Primary Examiner—Jeffrey V. Nase
Attorney, Agent, or Firm—Craig & Antonelli

[57] ABSTRACT

Packet handling apparatus includes a conveyor for moving packets in line from a delivery station and a reversible accumulator for receiving batches of packets from or returning batches to the conveyor according to whether supply exceeds demand or vice versa. Gates for supplying movement of packets on the conveyor are provided at the exit from and entry to the accumulator. The conveyor section adjacent the accumulator is separately drivable so that it may be temporarily stopped to create a gap between packets for insertion of the exit gate prior to transferring a batch of packets to the accumulator. Guides may be provided upstream and downstream of the accumulator for moving packets from a flat to an upright condition and vice versa, respectively.

6 Claims, 15 Drawing Figures

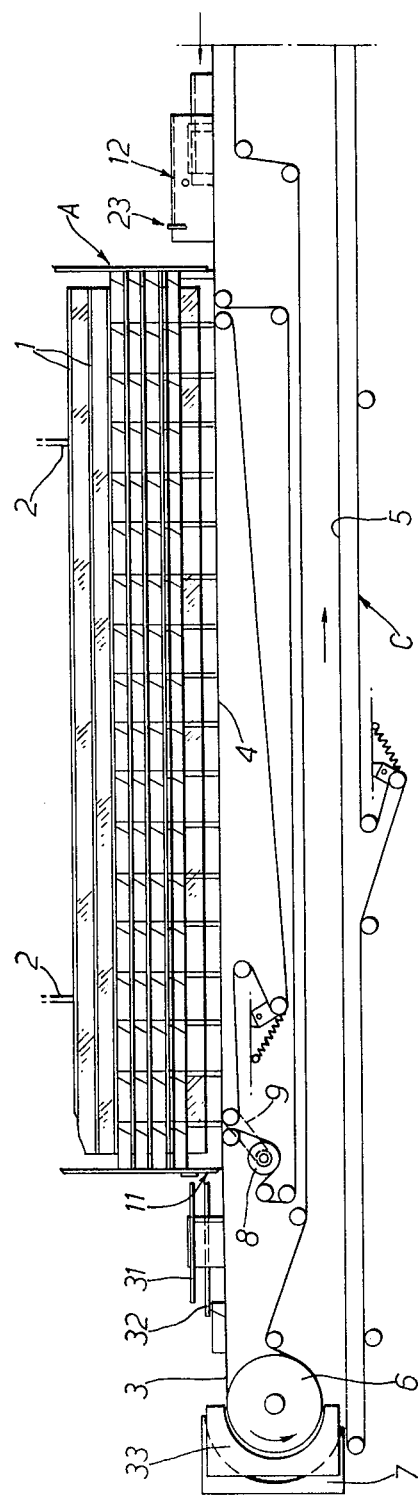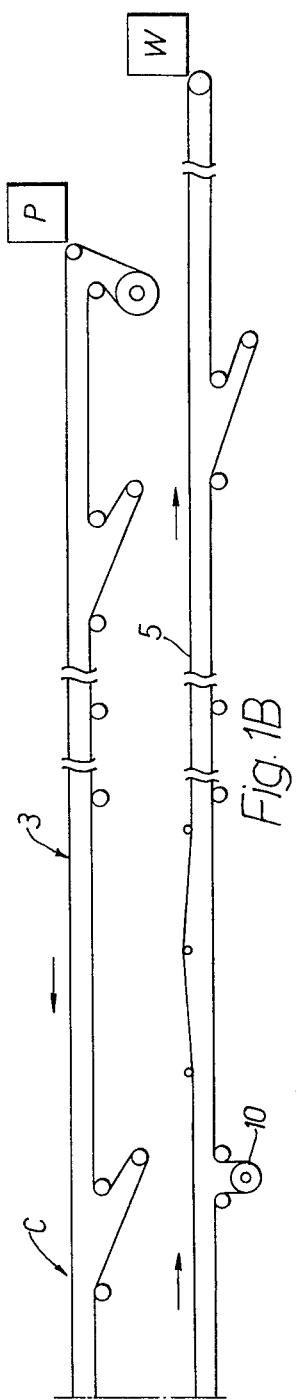

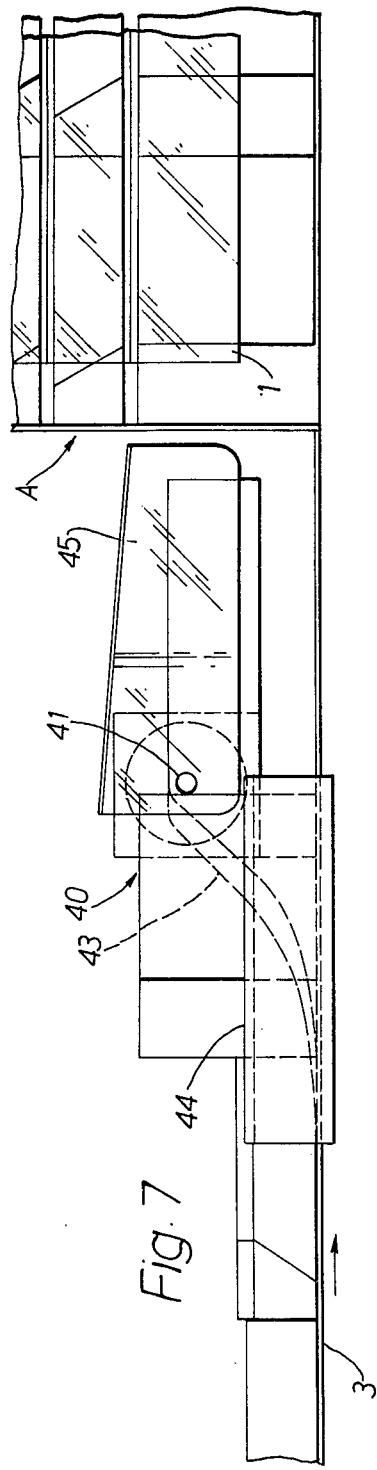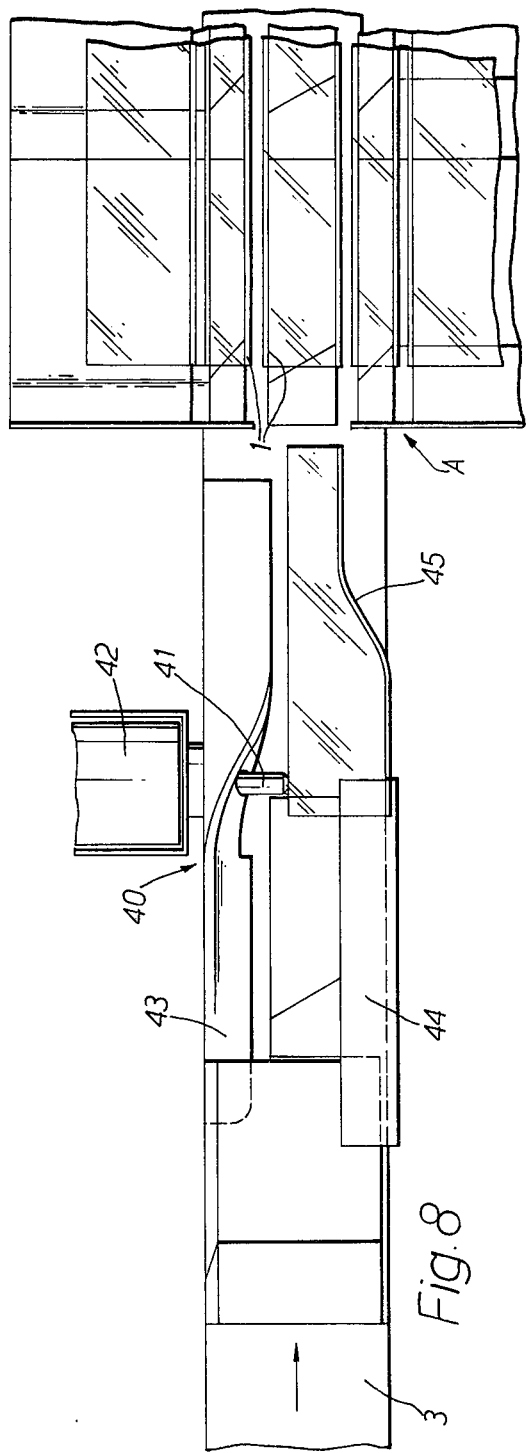

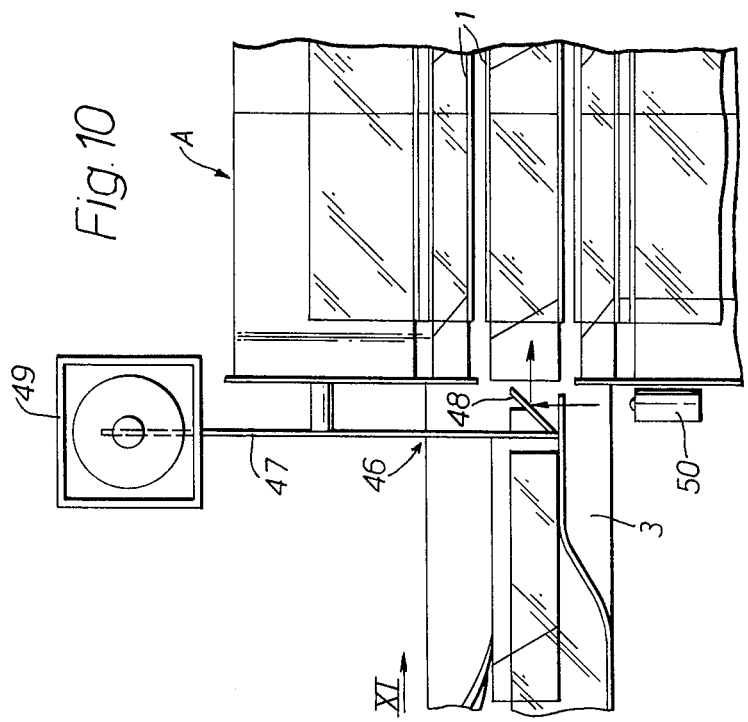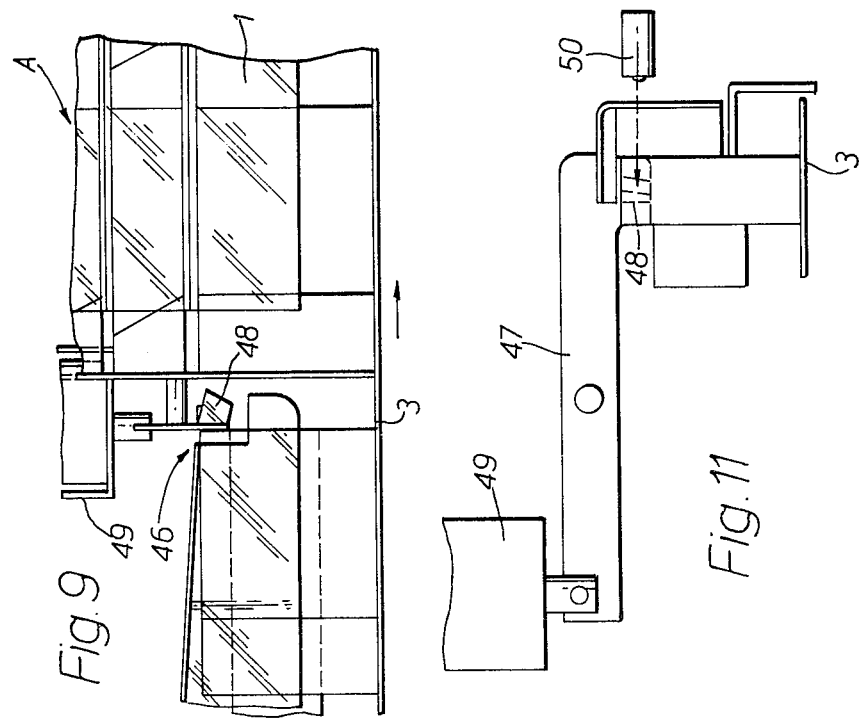

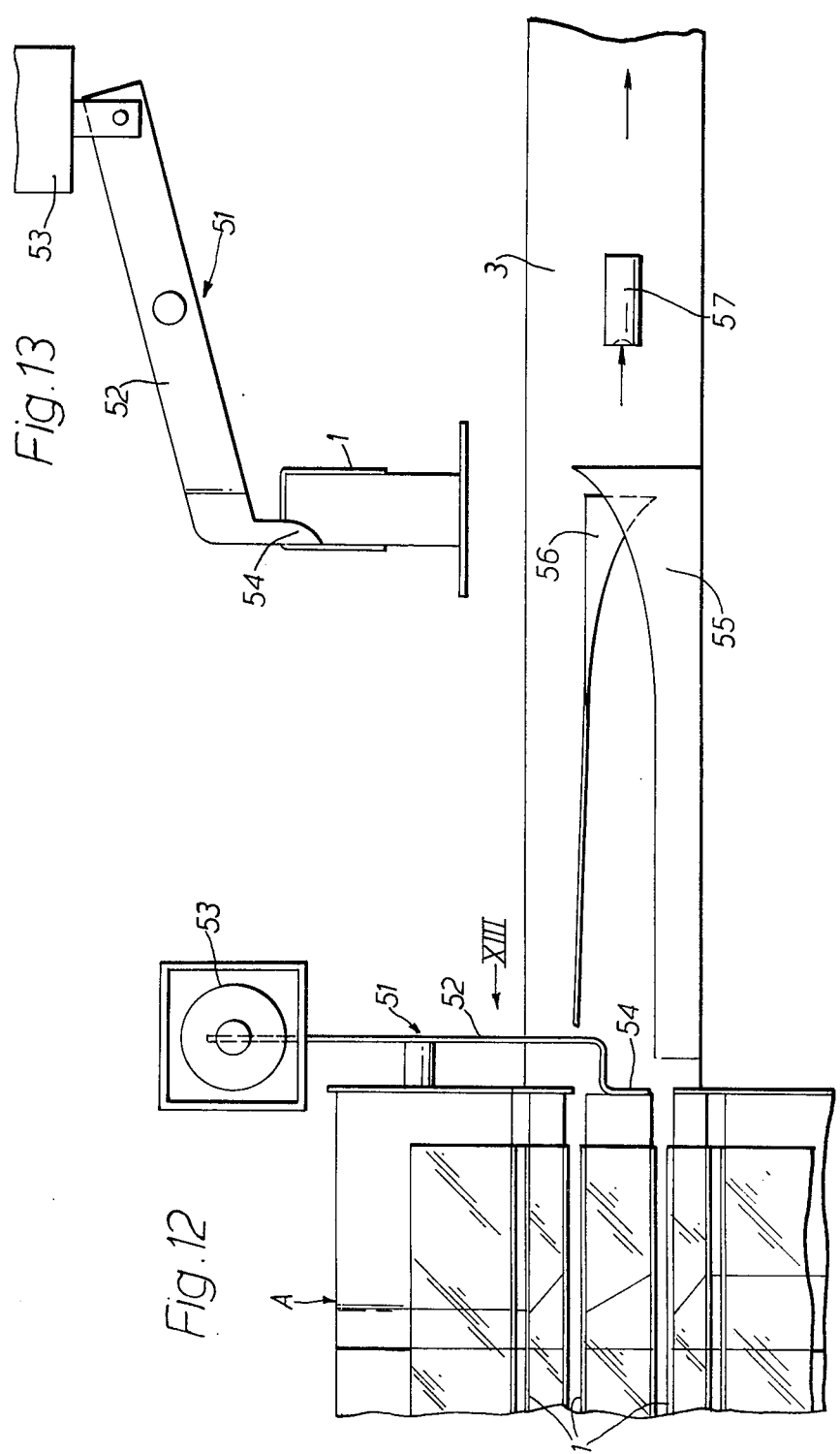

PACKET HANDLING APPARATUS

This invention is concerned with handling apparatus for packets, especially packets at least approximately in the form of right parallelepipeds such as those used for packaging cigarettes.

In the cigarette industry it is sometimes desirable to transfer packets between machines or parts of a machine (e.g. a cigarette packing machine and a packet wrapping machine) by means of a conveyor on which packets are moved in line. Where the supply and demand of the machines or parts of a machine are not matched the conveyor may be associated with a reservoir for temporarily storing packets.

One form of packet handling apparatus, as disclosed in U.S. Patent Application Ser. No. 2372, includes a main conveyor for moving packets in line, and a reversible reservoir (or accumulator) including an endless conveyor having spaced partitions for removing batches of packets transversely from the main conveyor and for supporting the batches in the reservoir. The present invention is particularly, but not exclusively, intended for use with apparatus of this type.

One aspect of the invention provides packet handling apparatus including a conveyor for moving packets in line; a reversible accumulator arranged to receive batches of packets from or return batches to the conveyor in a transfer region; gate means at or near the exit from the transfer region, including a gate movable onto an operative position to stop packets on the conveyor when it is required to transfer a batch from the conveyor to the accumulator; and means adapted to allow the gate to be inserted in a continuous line of packets on the conveyor.

The means adapted to allow the gate to be inserted may comprise means for creating or increasing a gap between packets on the conveyor. The means for creating or increasing a gap may comprise separately drivable sections of said conveyor and means for temporarily causing the downstream section to run faster than the upstream section. The conveyor sections may normally run at the same speed. The temporary speed differential may be caused by accelerating the downstream conveyor or, preferably, by stopping or slowing the upstream conveyor. The temporary speed differential may be initiated in response to a requirement to load a batch of packets. The speeds of the conveyor sections may be returned to their normal values in response to a signal from further sensor means that a gap is present between packets so that entry of said gate into its operative position is possible.

The means adapted to allow the gate to be inserted may comprise guide means arranged to redirect onto its normal path on the conveyor a packet displaced by operation of said gate whilst said packet is passing. The guide means may be part of means for changing the orientation of packets on the conveyor downstream of the transfer position. Preferably a packet displaced by the gate moving into its operative position is moved in the same direction as the means for changing the orientation of packets normally moves packets. Thus packets may be turned through 90°, from a flat position on the conveyor to an upright position, by opposed stationary suitably-shaped guide surfaces adjacent the conveyor just upstream of the transfer region. Further guide means may be provided adjacent the conveyor downstream of the transfer region for returning packets to a flat condition on the conveyor. This arrangement is particularly useful for apparatus including a conveyor linking a cigarette packing machine and a packet wrapping machine, where it is more convenient to deliver and receive packets in a flat condition, and an accumulator of the general type shown in FIG. 4 of U.S. Patent Application Ser. No. 002,372, where the packets are received in an upright condition.

Another aspect of the invention provides packet handling apparatus including a conveyor for moving packets in line from a delivery station to a receiving station; a reversible accumulator arranged to receive batches from and return batches to the conveyor in a transfer region; and a control circuit including means for monitoring packets from the delivery station, and means to initiate an unloading sequence in which an entry gate is inserted to prevent entry of packets to the transfer region and a batch of packets is deposited on the conveyor in the transfer region, said circuit being arranged to initiate an unloading sequence when said monitoring means indicates that the packet flow from the delivery station is below a predetermined level, whereby batches of packets may be returned to be conveyor between packets passing from the delivery station to the receiving station so that said accumulator is progressively unloaded as long as said receiving station can accept packets. The monitoring means may include timer means for measuring the gaps between packets and arranged so that an unloading sequence is initiated when the gaps are above a predetermined minimum length.

In the case where the delivery station is a cigarette packing machine and the receiving station is a packet wrapping machine the arrangement described in the previous paragraph allows a batch of packets to be unloaded from the accumulator onto the conveyor whenever possible, even when the packing machine is running normally since in this condition there would usually be gaps between the packets on the conveyor. Thus the accumulator normally gravitates to its empty condition at which it offers maximum potential storage for the output of the packing machine in the event of failure of the wrapping machine. In a preferred arrangement the receiving station (wrapping machine) is operable at a normal and a higher speed, the packet handling apparatus including means for signalling to the receiving station to operate at its higher speed when packets are being unloaded from the accumulator while packets are still passing from the delivery station (packing machine).

Figure 3:
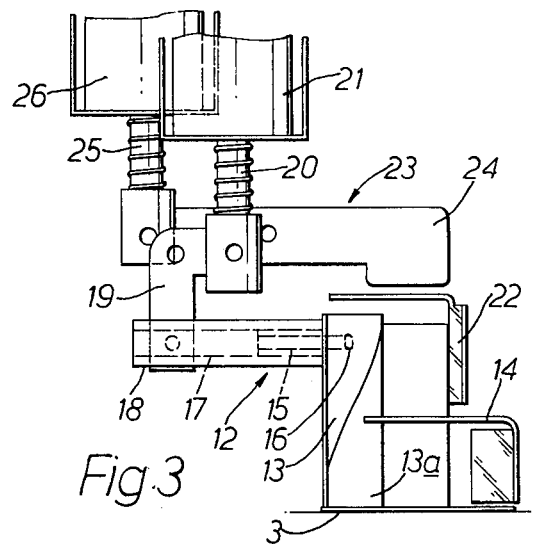
Figure 6:
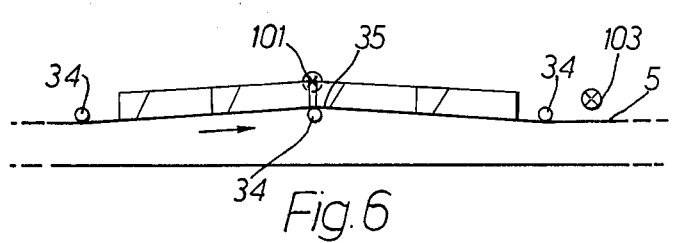
Figure 5:
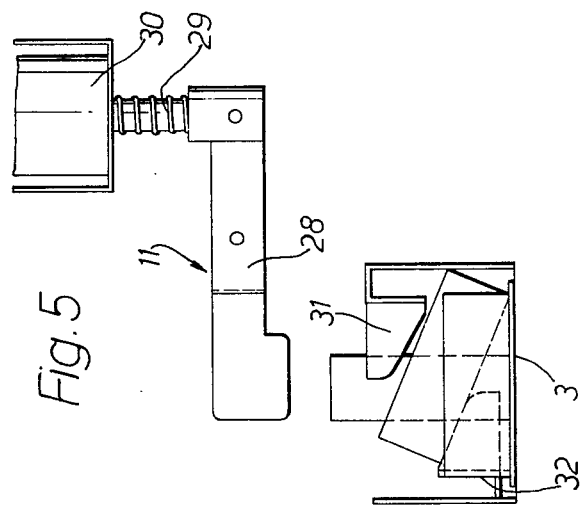
Figure 4:
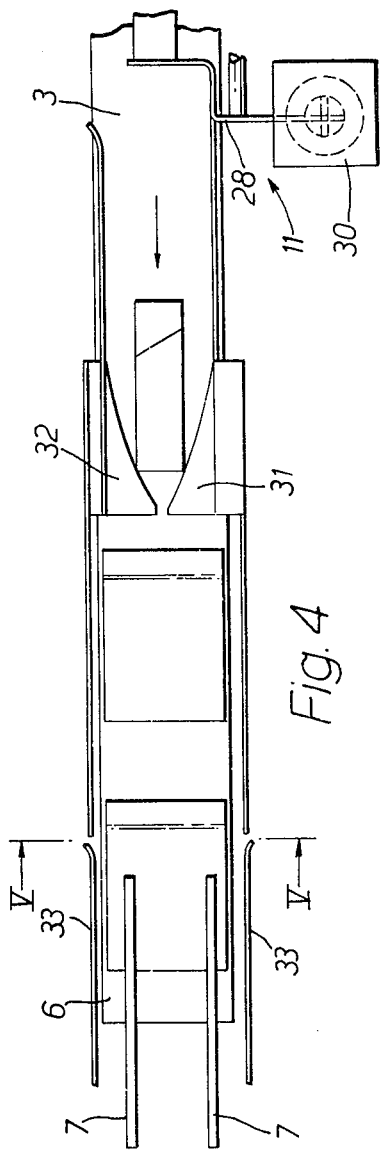
Figure 14:
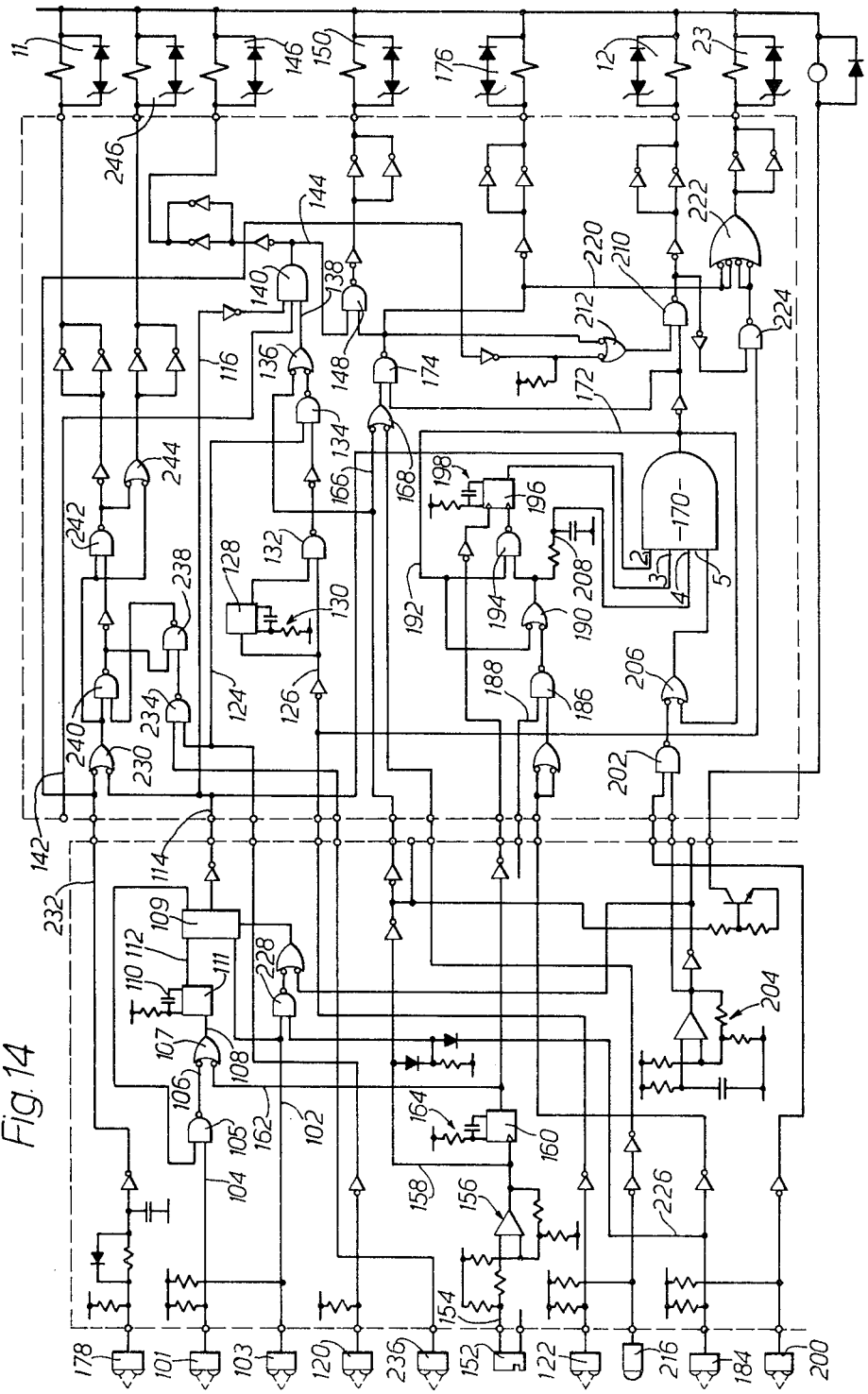

The invention will be further described, by way of example only, with reference to the accompanying diagrammatic drawings, in which:

FIGS. 1A and 1B, taken together, are a side view of packet handling apparatus including a packet accumulator, FIG. 2 is a plan view of part of the apparatus of FIG. 1 near the upstream end of the accumulator, FIG. 3 is a view on the line III—III of FIG. 2, FIG. 4 is a plan view of part of the apparatus of FIG. 1 near the downstream end of the accumulator, FIG. 5 is a view on the line V—V of FIG. 4, FIG. 6 is an enlarged side view of part of the apparatus downstream of the accumulator, FIG. 7 is a side view of a modified arrangement near the upstream end of a packet accumulator, FIG. 8 is a plan view of the arrangement of FIG. 7, FIG. 9 is a plan view of another modified arrangement near the upstream end of a packet accumulator, FIG. 10 is a plan view of the arrangement of FIG. 9, FIG. 11 is an end view in the direction of arrow XI in FIG. 10, FIG. 12 is a plan view of a modified arrangement near the downstream end of a packet accumulator, FIG. 13 is an end view in the direction of arrow XIII in FIG. 12, and FIG. 14 is a circuit diagram of a control system for the apparatus of FIG. 1.

FIGS. 1A and 1B show packet handling apparatus including a line conveyor C for moving cigarette packets from a cigarette packing machine P to a packet wrapping machine W. Associated with the conveyor C is a packet accumulator A operable to accept packets from the conveyor, temporarily store packets, or return packets to the conveyor, according to conditions in the apparatus as monitored by packet sensors along the conveyor C.

The accumulator A comprises an endless series of adjacent compartments 1 carried by endless belts 2 and provides a packet store extending above the conveyor C. Each compartment 1 is adapted to hold a batch of eighteen packets. The lowermost compartment 1 is aligned with and just above the conveyor C so that packets on the conveyor can pass through it. In normal operation spaced packets from the packer P pass straight through this lowermost compartment 1 and on towards the wrapper W. When it is necessary to load or unload packets the compartments 1 of the accumulator A are moved transversely relative to the conveyor C and sweep batches of packets off or onto the conveyor. The movement of the accumulator A is intermittent and, when stationary, a compartment 1 is always positioned over the conveyor C. This type of accumulator is described and illustrated in British Pat. No. 1,559,796, to which reference is directed for further details.

The conveyor C includes a main upper conveyor 3, a subsidiary upper conveyor 4, and a lower conveyor 5. Each of these conveyors passes over or around various support and tensioning rollers. The main upper conveyor 3 is effectively in two sections, separated by the subsidiary upper conveyor 4 which conveys packets through the accumulator A. At its downstream end the main upper conveyor 3 passes around a roller 6 and, in cooperation with curved guides 7, delivers packets to the lower conveyor 5. The main upper conveyor 3 is driven through a drive roll 8 and the subsidiary upper conveyor 4 is normally driven at the same speed by means of a disengageable clutch and drive belt 9. The lower conveyor 5 is driven by a drive roll 10.

The conveyors 3, 4 and 5 are normally continuously driven. When it is required to load the accumulator A an exit gate 11 is operated to stop packets relative to the conveyors 3 and 4 and assemble a batch of eighteen abutting packets for transfer into the accumulator. Similarly, when it is required to unload, an entry gate 12 is operated to stop packets passing beyond it into the accumulator A on conveyors 3 and 4, so that when these conveyors have cleared in the region of the accumulator a batch of eighteen packets may be returned from the accumulator for transfer downstream to the wrapper W.

Packets are conveyed on most of the conveyor 3 and on the conveyor 5 in a flat condition whereas they are received in the compartments 1 of the accumulator A and on the conveyor 4 in an upright position. Packets arriving from the packer P on conveyor 3 are moved to their upright condition just upstream of the accumulator A in the vicinity of the entry gate 12, as shown in FIGS. 2 and 3. This movement is achieved by means of stationary guides 13, 14. The guide 13 has a leading edge 13a positioned just above the conveyor 3 in the path of the left-hand side of a packet. From the edge 13a the guide 13 curves upwardly along the conveyor 3. The guide 14 includes a vertical surface along the right-hand side of conveyor 3 and a horizontal portion extending over the conveyor 3 and including a curved edge 14a. The combined effect of the guides 13 and 14 on a packet conveyed by the conveyor 3 is that the left-hand leading corner of the packet is lifted by the edge 13a and progressively moved upwards by the shape of the rest of the guide 13. The vertical surface of guide 14 stops the packet being shifted transversely off the conveyor 3 and the curved edge 14a engages the already-lifted upper face of the packet and cooperates with the guide 13 to complete the movement into an upright position.

The entry gate 12 comprises a pin 15 movable through a bore 16 in the guide 13. The pin 15 is attached to a plunger 17 slidable in a guide 18. The plunger 17 is connected to one end of a pivoted crank 19, the other end of which is connected to a movable rod 20 operated by a solenoid 21.

When it is required to operate the entry gate 12 to stop packets on the conveyor 3 the solenoid 21 is activated with the result that the pin 15 extends out from the guide 13 into the path of a packet. The pin 15 engages the upper left-hand corner of the packet just before it has reached its upright condition and prevents further downsteam movement of the packet. This packet blocks the following packets so that a line of abutting packets is built up on the conveyor 3 upstream of the pin 15 whilst the entry gate 12 is operated.

If the solenoid 21 is activated so that the pin 15 moves out to its blocking position while a packet is passing, the pin merely pushes this packet aside (and also completes its movement to an upright condition) while allowing it to pass. The following packet is then stopped by the pin 15. The packet which has been pushed aside by the pin 15 is guided back to a central position on the conveyor 3 by a stationary guide 22.

Just downstream of the entry gate 12 is a further gate, the mirror gate 23. This comprises a pivoted lever 24, one end of which is connected to a movable rod 25 operated by a solenoid 26. When the solenoid 26 is activated the lever 24 is pivoted to a position in which its free end is in the path of the upper parts of the packets on the conveyor 3, so that the gate 23 can act as a secondary or back-up entry gate. However, the main (and in some circumstances the only) purpose of the mirror gate 23 is to carry a mirror or other polished surface 27 for reflecting a beam of visible or infra-red light which passes aong the path of the packets through the accumulator A onto a sensor. As will be explained later in connection with the control of the apparatus, this ensures that the path through accumulator A is empty prior to unloading (i.e. when the entry gate 12 and mirror gate 23 are closed). As shown in FIGS. 2 and 3, the mirror gate surface 27 is normal to the path through the accumulator A and can reflect light directly back along this path (so that an adjacent source and sensor at the other end of the accumulator may be used). The surface 27 could, however, be angled, for example at 45°, so that the light path extends to the side of conveyor 3.

A gate similar to the mirror gate 23 could be used as the only entry gate but this would require a packet sensor to ensure that the gate could not close as a packet was passing it.

The exit gate 11 is shown in FIGS. 4 and 5 and comprises a cranked pivoted lever 28 connected to a movable rod 29 operated by a solenoid 30. When the exit gate 11 is operated in response to a signal to load the accumulator A, the solenoid 30 is activated and the lever 28 is moved so that its free end stops the packets moving beyond the end of the accumulator. As with the entry gates the lever 28 just engages the upper part of a packet to stop it. It is important to note that the gate 11 is so positioned that the leading packet stopped still has more than half its length within the lowermost compartment 1 of the accumulator A, so that it is included within the batch of packets moved into store when the accumulator drive is operated after the complete batch has assembled upstream of the gate.

Adjacent the exit gate 11 is a sensor (the exit gap sensor 236—FIG. 14) for detecting a gap between packets and allowing activation of the solenoid 30 only at times when the lever 28 will come down between the packets. In some circumstances of operation, however, it may be necessary or desirable to start loading the accumulator when there is a continuous stream of abutted packets in the region of the exit gate 11. Referring to FIG. 1A, it will be recalled that the drive to subsidiary upper conveyor 4 is by means of a disengageable clutch. Accordingly, whenever it is required to load the accumulator A the clutch is momentarily disengaged to stop the conveyor 4 (see control circuit of FIG. 14; the clutch operating element is 246) while the conveyor 3 continues at normal speed, thereby creating a gap between packets just upstream of the exit gate 11. The exit gap sensor 236 detects this gap and allows the exit gate 11 to operate and the clutch then re-engages. The duration of the stoppage is equivalent to about 1 packet length at normal running speed (i.e. of the order of 200 msec.). It may be noted that the provision of a separable drive for the conveyor 4 is a refinement and that in many conditions of operation of the apparatus a single upper conveyor 3 passing through the accumulator A could be used.

Downstream of the exit gate 11 packets are returned to their flat condition by means of opposed stationary upper and lower guides 31, 32, respectively, as shown in FIGS. 4 and 5. Both guides 31 and 32 are curved downwardly and inwardly with respect to the conveyor 3 so that the upright packet is twisted onto its side as it passes the guides. Subsequently the packets pass around the roller 6 with the aid of the curved guides and side guides 33. The effect of the guides 31, 32 and passage around the roller 6 on the packets is that the latter have the same sides uppermost on the conveyors 3 and 5; the guides following the exit gate 11 could however be arranged so that packets are inverted on the conveyor.

It is possible that the exit gate 11 could be replaced or supplemented by another exit gate basically similar in operation to the entry gate 12 (and therefore not requiring the presence of a gap between packets for its operation). However, the most convenient position for such a gate would be in the region of the guides 31, 32; this has the disadvantage that during a sequence when several batches of packets are loaded onto the accumulator one or more packets are stationary between the gate and the batches during the whole loading sequence. Such packet or packets can become damaged by the transmitted impact as each successive packet is stopped by the abutted stream. While it might be possible to position the gate of this type immediately adjacent the accumulator A so that this disadvantage is overcome, additional guides would be necessary for any packets displaced by the entry of the gate pin.

FIG. 6 shows part of the lower conveyor 5 leading from the accumulator A to the wrapper W. In this region the conveyor 5 is guided by rollers 34 so that a shallow hump 35 is created in its conveying surface. In conditions where there is an abutting line of packets on the conveyor 5 slight gaps are created between the packets as they pass over the hump 35 and these gaps are sensed by a sensor 101. Another sensor 103 positioned downstream of the hump 35 will register a continuous stream of abutting packets.

FIGS. 7 and 8 show a modified entry gate 40, which is similar to the entry gate 12 but which includes a pin 41 which is an extension of the movable core of a solenoid 42. The pin 41 acts in the same way as the pin 15 to block the path of packets on the conveyor 3, displacing any passing packet and stopping the following packet. Guides 43, 44 and 45 are provided for the packets and these are generally similar in their function to the guides 13, 14 and 22 respectively.

FIGS. 9, 10 and 11 show a modified mirror gate 46 which may be used in the same way as the mirror gate 23. The gate 46 comprises a pivoted lever 47 carrying a mirror 48 at one end and connected to the movable core of a solenoid 49 at the other end. The mirror 48 is carried on the side of the lever 47 adjacent the accumulator A so that when the gate 46 is actuated the mirror is moved into a position at which light reflected from it passes along the path of packets through the accumulator A. As shown in FIG. 10, the mirror 48 is angled at about 45° to the line of conveyor 3 and receives light from a source 50. A sensor is arranged at the other end of the accumulator A to detect light reflected by the mirror 48 when there are no packets on the path through the accumulator.

FIGS. 12 and 13 show a modified exit gate 51, usable in the same way as the exit gate 11. The gate 51 includes a cranked pivoted lever 52 connected at one end to the movable core of a solenoid 53 and having at the other end a projection 54 adapted to engage a top corner of a packet when the gate is closed. FIG. 12 also shows guides 55, 56 for returning a packet on the conveyor 3 to its flat condition. The guides 55, 56 act in a similar way to the guides 31, 32.

It is possible to use the gate 51 without a sensor to detect gaps between packets since, if the gate is actuated while a packet is passing, the projection 54 simply topples the packet towards the guide 56, allowing this packet to pass and stopping the next packet. In other words, in this case the gate 51 merely performs some of the work normally done by the guide 55. Since there is no need to create gaps between packets for the gate 51, the conveyor 3 could extend straight through the accumulator A, (the conveyor 4 being removed). The gate 51 is somewhat similar in action to the pin gates 12, 40, and could be used as a modified entry gate.

Also shown in FIGS. 12 and 13 is a photosensor 57 positioned to receive light reflected through the accumulator A by a mirror gate 23 or 46. The photosensor 57 is positioned downstream of the guides 55, 56 so that it can be in the line of the path of upright packets through the accumulator A. It will, of course, be appreciated that the positions of the light source 50 and photo-sensor 57 could be reversed. Also, where the mirror gate is arranged to reflect light back along the path through the accumulator A, a light source may be positioned adjacent the photo-sensor 57.

Referring to FIG. 14, the operation of the accumulator A is controlled by a series of sensors (178, 101, 103, 120, 236, 122, 216, 184, 200) arranged to detect the presence and movement of packets on the accumulator conveyor and those feeding to and from it (C), and by an additional sensor (152) which is connected to the accumulator drive mechanism and provides a signal indicative of the position of the accumulator, i.e. whether it is in a load/unload position in which packets can be transferred, or whether it is in an intermediate position because a row of packet holders is moving to or from the load/unload position.

Referring to the circuit diagram, FIG. 14, in detail, when a stoppage occurs downstream of the accumulator, the "build-back detector", comprising sensors 101 and 103, will detect that the stoppage has occurred in the following way. Sensor 103 is arranged to provide a signal level which is "low" when it detects a packet, and is connected via line 102 to the D input of a bistable 109. The signal will be a continuous "low" after a stoppage has occurred, because sensor 103 will then detect a continuous line of packets. Of course, a continuous line of packets would also be detected in the event that the packets were abutting or very close together but were moving, and in order to dis-criminate between the stationary and the moving condition, sensor 101 is so arranged that it provides a series of pulses when packets are moving, but remains at a constant level when the packets are stationary. This is achieved by arranging a small "hump" in the conveyor, as explained above with reference to FIG. 6, so that a gap is created between adjacent packets as they pass beneath the sensor 101, even if they were previously in a continuous line. Thus sensor 101 sees alternate packets and gaps as long as the packets are moving, but when the packets are stationary it will see either a packet or a gap so the stream of output pulses will stop.

As sensor 101 is arranged to give a high output to indicate the presence of a packet, its output when the packets are moving consists of a series of short negative-going pulses corresponding to gaps. These are fed on line 104 to one input of a NAND-gate 105, whose other input has previously been set high. Thus the output of the NAND-gate 105, on line 106, consists of a series of negative going pulses corresponding to passing packets, until the stoppage occurs. This output is connected to one input of a NOR-gate 107.

Thus the output of the NOR-gate 107 on line 108 consists of a series of positive-going pulses and these are fed to the input of a monostable 111 which has a timing capacitor 110 of such a size that when the packets are moving slowly, the incoming pulses on line 108 cause output pulses of a predetermined length to appear at the $\overline{Q}$ output on line 112. If the packets are moving sufficiently fast the input pulses will be close enough together to keep the monostable 111 triggered, so that the $\overline{Q}$ output will be permanently low. This output is fed on line 112 to the trigger input of the bistable 109 so that while the packets are moving quickly the $\overline{Q}$ output remains high, and this is connected to the input of gate 105 so keeping the circuit receptive to incoming signals.

When the predetermined low speed is reached or of course when a stoppage occurs, the output of the monostable 111, on line 112 rises and triggers the bistable 109 whose D input is connected to sensor 103 via line 102, and therefore is "low" when a stoppage has occurred. This causes the $\overline{Q}$ output of 109 to go high, and this signal is inverted to give a low output on line 114. At the same time, the Q output of 109, which is connected to the input of NAND-gate 105 (see above) goes low, so as to disable any further input to the NAND-gate.

The low voltage on line 114 is the "load" control signal, and is fed to one input of a NOR-gate 230. The other input of the NOR-gate 230 is from line 232 which is connected via an inverter to the "exit packet jam" sensor 178, downstream of the accumulator, which gives a low output when no packets are sensed. Thus before the "low" load signals appear on lines 114 and 232, the output of gate 230 is low, and when they appear the output goes high. These signals are ultimately used to control the exit gate 11, to close it so that packets will queue up on the conveyor, but before the gate can be closed, a gap normally must be created in the line of packets into which the gate can enter. This is done in the following way:

One input of a NAND-gate 234 is connected to an "exit gap" sensor 236 at the position of the exit gate 11, which gives a high output when a gap is detected and this will normally give alternately high and low signals before loading commences, indicating a flow of packets. The other input of the NAND-gate 234 is connected via an inverter to a "row full" sensor 120 so as to receive a "high" signal whenever a packet is detected at the position of this sensor, which is next to the "exit gap" sensor 236. Thus the two inputs to gate 234 will be pulsing as gaps pass, and its output will only be "low" when gaps are detected by both simultaneously.

The output of gate 234 is connected to one input of a NAND-gate 238 which is cross-coupled with another NAND-gate 240. The remaining input of gate 240 is connected to the output of gate 230 which, it will be recalled, is "low" before the load signals appear. Thus the output of gate 240 is initially high, and the cross-coupling allows the output of gate 238 to pulse in response to the input from gate 234. This pulsing has no effect on the output of gate 240 because of the connection of its input to the "low" output of 230. The "high" output of gate 240 is fed via an inverter to one input of a NAND-gate 242 whose other input is connected to the initially low output of gate 230, and so the output of gate 242 is initially high.

This output is inverted twice for connection to the exit gate 11, and thus the gate is initially deenergised, i.e. open. The low output of gate 230 is also fed to one input of a NOR-gate 244, whose other input is driven by the high output of gate 242, so that the output of 244 is high and this output is fed via an inverter to a belt clutch 246 so as to energise it. The clutch 246 drives the subsidiary conveyor 4 (via belt 9), enabling it to be stopped independently of the main conveyor 3 so as to create a gap in the flow of packets, as described above with reference to FIGS. 4 and 5. This is achieved as follows.

As soon as lines 114 and 232 go "low" the output of gate 230 goes high and thus the gate 244 has both inputs temporarily "high"—thus its output goes low so the clutch 246 is de-energised, and the conveyor 4 stops briefly. The high output of gate 230 is, however, also applied to gate 240, and when both sensors 120 and 236 detect gaps simultaneously, as a result of the stopping of the conveyor 4, a low output will be applied to the input of cross-coupled gate 238 via gate 234. Thus its output will go high so that both inputs to gate 240 will be high, and its output will go low so that now both inputs to gate 238 will be low as a result of the cross-coupling, so that the gates are latched until the "load" signal disappears.

The low output of gate 240 is then applied via the inverter to the input of gate 242 so that both its inputs are now high, so its output goes low, and the exit gate 11 is closed. At the same time this low output is applied to gate 244 so that the clutch 246 is re-energised causing the conveyor 4 to run.

With the exit gate 11 closed, a row of packets begins to build back on the conveyor, from the exit end of the accumulator towards the entry gate 12. The "row full" sensor 120 at the exit end of the accumulator will now give a continuous low output level because of the detected packets, and an entry gate sensor 122 at the entry end of the accumulator is arranged to give a high signal level when it detects a stationary packet. The signal from the row full sensor 120 is inverted and fed to the line 124, i.e. as a "high" signal, and the signal from sensor 122 is inverted twice and fed to line 126, and is thus also a "high" signal. This signal is fed to a monostable 128 which is provided with a timing circuit 130 arranged to provide a negative-going output pulse of a preset length from its Q output when the monostable is triggered. This output is fed to one input of a NAND-gate 132, whose other input is fed with the positive-going pulse on line 126.

The effect of this arrangement is that when a packet is detected by the entry gate sensor 122, a positive-going pulse arrives at one input of NAND-gate 132, on line 126, while a negative-going pulse arrives at the other input from the monostable 128, and thus "holds off" the gate. At the end of the timing period the output of the monostable 128 again goes high, and thus if the high level is still present on line 126, indicating that the packet is still present at the sensor 122, a negative-going pulse will be produced at the output of gate 132. This arrangement ensures that an output will only be produced if the packet is detected for a sufficiently long period, i.e. if it is stationary or moving so slowly as to indicate that the row is in fact full.

The output of gate 132 is inverted and fed to one input of a NAND-gate 134 whose other input receives the high signal on line 124 (indicating a packet detected by the row full sensor 120). The resulting negative-going pulse is fed to one input of a NOR-gate 136 and consequently a positive-going pulse appears at the output of the NOR-gate on line 138.

Line 138 is connected to one input of a NAND-gate 140, which has two other inputs. One of these is connected to a microswitch which closes when the accumulator is completely full, giving a low output, so that normally, when the accumulator still has loading space, line 142 is high, enabling the NAND-gate 140. The third input of NAND-gate 140 is connected via an inverter to line 116 which receives the "low" signal from the build back sensor circuit (see above).

Thus under these conditions all three inputs of the NAND-gate 140 are high and consequently a "low" signal level is produced at its output on line 144. This is supplied via two successive inverting stages to activate the up-clutch 146, which engages the drive of the accumulator so as to raise the packets from the conveyor and up one level in the accumulator.

At the same time, the low signal on line 144 is fed to one input of NAND-gate 148, so that the NAND-gate output goes high, and this output is fed after two inversions to the brake 150, which is thus released, allowing the upward movement of the accumulator to take place.

As the row of packets is shifted off the conveyor, the row full sensor 120 and the entry gate sensor 122 will cease to detect packets, and in order to ensure that the movement is continued until it is completed, a signal is is provided from an "elevator home" or "disc" sensor 152 which comprises a slotted disc which rotates adjacent a detector arranged to give a low output when the slot is detected, which occurs at the rotational position of the accumulator drive in which a row of packets can run through the accumulator on the conveyor, i.e. the load/unload position. Thus while the accumulator is moving, the output from detector 152 on line 154 is high, and this output is fed to an inverting amplifier stage 156 whose output is therefore low in the intermediate positions of the accumulator. At the beginning of the loading sequence, the slotted disc is of course at the "home" position, and thus the signal on line 158 is high. This signal is fed to a monostable 160 and an output is taken from the $\bar{Q}$ output which is, of course, maintained at a low level as long as the trigger input is fed with a high signal. The output is connected via line 162 to NOR-gate 107 of the build back sensor circuit (see above) but because the other input of the NOR-gate is already low, the signal has no effect on it. When the slotted disc moves away from the home position, the output of amplifier 156 goes low, and thus the triggering signal is removed from monostable 160 and after a predetermined period set by its timing circuit 164, the level at the $\bar{Q}$ output goes high. By this time however, the D type bistable 109 has been triggered by the build-back sensors 101, 103, and so although both inouts to the NOR-gate 107 are now high, the loading sequence continues. Since the $\bar{Q}$ output of the D type bistable 109 has already gone low, gate 105 is disabled so that subsequent inputs on line 104 from build-back sensor 101 have no effect on the circuit.

When the disc sensor 152 again reaches the home position, i.e. when one row of packets has been completely loaded, the output on line 154 again goes low, and thus the output on line 158 goes high, triggering the monostable 160. The $\bar{Q}$ output on line 162 therefore again goes low (and is maintained at this level as long as the disc sensor 152 remains in the home position) and thus the NOR-gate 107 again receives a negative-going pulse so that its output on line 108 is a positive-going pulse which triggers monostable 111 so that after the preset time period governed by timing circuit 110, a positive going pulse appears at the $\bar{Q}$ output to trigger the D type bistable 109. The $\bar{Q}$ output of bistable 109 therefore goes high, thus enabling the NAND-gate 105, and this means that the build-back sensor circuit is again in a condition in which it monitors the build-back sensors 101, 103 to determine whether there is still a queue of packets downstream of the accumulator. If so, the loading sequence is initiated again in the same manner as described above, and is repeated until the queue is cleared.

The output of the disc sensor 152 is also connected via two serially connected inverters to line 166, and whilst the accumulator is in motion during the loading phase the low output thus provided on line 166 drives the NOR-gate 136 (the drive derived from the row full sensor 120 and the entry gate sensor 122 having been removed when the packets were lifted from the conveyor) and thus ensures that the up-clutch 146 remains energised via NAND-gate 140. When the disc sensor 152 reaches the home position, line 166 goes high, so that both inputs to NOR-gate 136 are now high, and line 138 therefore goes low, disabling NAND-gate 140 and consequently de-energising the up-clutch 146.

The output of the build-back sensor circuit on line 114 (see above) which is low during the loading cycle, is also connected to one input of a NAND-gate 170 which forms the output of the unload cycle control circuit. Thus the low level on line 114 has the effect of disabling the unload circuit for the duration of the load cycle. As a result, line 172 is connected to the output of NAND-gate 170 is high for the duration of the load cycle, and this high level is inverted and fed to one input of a NAND-gate 174 whose output therefore also remains high for the duration of the load cycle.

Because of the high level at the output of NAND-gate 174, the down-clutch 176 is of course inactivated, and it will be recalled from the above description that the brake 150 is also inactivated during the load cycle because the low level on line 144 is supplied to one of inputs of the NAND-gate 148. When the disc sensor 152 reaches the home position, line 144 goes high (see above) supplying a high level to one input of NAND-gate 148, and the other input already has a high level as the output of NAND-gate 170 is maintained high during the load sequence. Thus when line 144 goes high, the up-clutch 146 is de-energised and the output of NAND-gate 148 goes low, energising the brake 150. This retains the accumulator in the correct position.

If as a result of the activation of the build-back sensor circuit by the signal on line 162 (see above) the packets are found to be moving, line 116 will go high, so that the exit gate 11 is released. Packets can then flow through the accumulator. When the accumulator is full the microswitch connected to line 142 closes and this produces a low signal at the input of gate 140, preventing operation of the up-clutch 146, and if packets then begin to build back along the accumulator conveyor, it will be necessary to stop the packer or divert its output from the accumulator input conveyor.

If packets are being taken away from the accumulator faster than they are being supplied, the unload sequence will be initiated, and will proceed at varying rates depending upon the excess of "demand" over "supply". Normally, this will occur after a stoppage downstream of the accumulator has been cleared and the load sequence has ended, in which case the unloading operation is as follows.

The unload enable sensor 184 is arranged to produce a high signal level each time it detects a gap between successive packets, and this signal is fed via line 226 to one input of a NAND-gate 228 whose other input is connected to line 102. The latter will now be "high" if no packets are detected by the build-back sensor 103, and thus in these circumstances a low signal will appear at the output of gate 228. This is inverted before being fed to the "set" input of bistable 109 so that the $\overline{Q}$ output of the bistable goes low. As a result line 114 goes high, inhibiting the load cycle and at the same time changing the input to pin 2 of NAND-gate 170 from low to high, so that the unload cycle is no longer inhibited by the load circuit.

The signal from the unload enable sensor 184 is also inverted twice before being fed to one input of NAND-gate 186, whose other input is connected to the "empty" microswitch via line 188. While the switch is open, i.e. while the accumulator is not empty, a high level appears on line 188, enabling the NAND-gate 186, so that the high input from the unload enable sensor 184 causes a low level to appear at the output of gate 186.

The application of this low signal to the input of NOR-gate 190 causes a high level to appear at its output which is fed to the pin 4 input of NAND-gate 170.

Until this enabling signal reaches the NAND-gate 170, the output on line 172 is high (i.e. previous to the detection of gaps by the unload enable circuit). This high signal is applied via line 192 to one input of a NAND-gate 194, whose other input is connected to the output of NOR-gate 190, and thus when the output of gate 190 goes high, a low level appears at the output of gate 194. This change of level is used (via an inverter) to trigger a monostable 196, whose $\overline{Q}$ output is high before the trigger signal is received, and is connected to the pin 3 input of the NAND-gate 170, so that pin 3 then goes low disabling the gate for the duration of the monostable output pulse.

The pin 5 input of the NAND-gate 170 is fed by a signal which is derived from the entry gap sensor 200 in the following way: the sensor gives a low output if there is a gap present in the flow of packets upstream of the accumulator (which gap is of course required if the unload cycle is to be initiated) and this low output is inverted and fed to a NAND-gate 202 whose other input is maintained at a high level by a biassing circuit 204. Thus the high input from the entry gap sensor 200 causes the output of gate 202 to go low, and this low output is fed to a NOR-gate 206. The output of the NOR-gate 206 therefore goes high, and is connected to pin 5 of the NAND-gate 170. The arrival of the output from NOR-gate 190, at the input of NAND-gate 170, is delayed by means of a delay circuit 208 so that it does not reach the NAND-gate till the $\overline{Q}$ ouput of monostable 196 has gone low, disabling gate 170. When the monostable 196 has been triggered, the $\overline{Q}$ output remains low for a predetermined period set by its timing circuit 198, in order to determine whether the gap detected by the unload enable circuit is sufficiently long to enable the unload cycle to be initiated.

If this is the case, the high level at the output of NOR-gate 190 will persist until the $\overline{Q}$ output of the monostable 196 again returns to a high level, and thus the output from NAND-gate 170 will go low. The circuit will then be locked into the unloading mode, further pulses being unable to trigger the monostable 196 since the gate 194 is disabled by the low signal on line 192.

If the pulse at the output of NOR-gate 190 does not persist for as long as the period set by the timing circuit 198 of the monostable 196, pin 4 of the NAND-gate 170 will go low before pin 3 goes high and thus its output will remain high, enabling gate 194 via line 192, so that the monostable circuit remains conditioned to measure the incoming gap signals.

The low signal appearing on line 172 at the output of the NAND-gate 170 to initiate the unload cycle is inverted and fed to one input of a NAND-gate 210, whose other input is fed from the "exit packet jam" sensor 178 which provides a low level if no packet is detected by the sensor (situated downstream of the accumulator and before the unload enable sensor 184). This low level is fed via two inverters to one input of a NOR-gate 212 and thus gives rise to a high level at its output which is connected to the other input of NAND-gate 210. Thus a low signal appears at the output of the NAND-gate 210 which is inverted twice before being fed to the entry gate 12 so as to close it.

The "row empty" sensor 216 operates by directing a beam along the conveyor through the accumulator, which is reflected onto the sensor by a mirror attached to the mirror gate 23 (as described above with reference to FIGS. 2 and 3), and thus while the mirror gate is open, no beam is reflected onto the sensor, and thus the sensor gives the same output as it would for "row full", that is to say its output is high. This is the condition of the circuit immediately prior to the beginning of the unload sequence. This high signal is inverted twice and appears on line 218 at one of the inputs to NOR-gate 168, whose other input is connected to the home sensor via line 166. Thus at this point both inputs to the NOR-gate are high so that its output is low. This output is connected to one of the inputs of NAND-gate 174, whose other input is connected via an inverter to line 172, and is therefore high at this point in the control sequence. Thus the output of gate 174 is also high, and this output is connected via line 220 to one input of a NOR-gate 222. As a result, the output of the NOR-gate 222 depends upon the signal received by its other input, and this is derived from the entry gate sensor 122 in the following way.

Assuming that no packets are present at the position of the entry gate sensor 122, its output will be low, and therefore the signal on line 126 will also be low. This low signal is fed to one input of a NAND-gate 224. The other input is driven via an inverter from the output of NAND-gate 210 which is noted above is presently at a low level, to close the entry gate 12, so that the input to NAND-gate 224 is high. Thus the output of NAND-gate 224 depends upon the condition of the entry gate sensor 122 and, as noted above, under the conditions specified this is low. The NAND-gate 224 is fed with an inverted signal from the entry gate sensor 122, and therefore this input receives a high level under these conditions, so that the output of the gate is low and is fed to the corresponding input of NOR-gate causing a high to appear at its output. After inversion, this supplies a low signal to the mirror gate 23 causing it to close.

As noted above, the closing of the mirror gate 23 positions the reflector for the row empty sensor 216, and in the meantime the motion of the conveyor through the accumulator clears any packs presently in the machine area. The row empty sensor 216 will then be able to detect that the conveyor is clear so that a low signal will appear at the corresponding input of NOR-gate 168. The output of NOR-gate 168 will then go high, causing the output of NAND-gate 174 to go low. This signal releases the power from the brake 150, and after being inverted twice drives the down-clutch 176 to engage it. A row of packets will then be lowered onto the conveyor.

During the process of lowering the packets, the row empty sensor 216 will of course detect them, so that the corresponding input of NOR-gate 168 will again go high. However, the connection of the other input of the NOR-gate 168 to the disc sensor 152 via line 166 causes the unloading motion to be maintained in the same way as described above with reference to the loading cycle.

When the disc sensor 152 reaches the home position, line 166 again goes high, so that the down-clutch 176 is de-energised and the brake 150 energised to retain the accumulator in the correct position.

The arrival of the disc sensor 152 at the home position also causes a trigger pulse to appear on line 226 (in the same way as described above for line 162 in connection with the loading cycle), and this pulse is used to re-trigger the monostable 196 of the unload circuit, so that the Q output goes low and thus the output of NAND-gate 170 goes high. A low signal will then appear at the input of NAND-gate 210 resulting in a high appearing at its output so that the entry gate 12 will be opened, to allow another row of packets to enter the apparatus if they are present on the upstream conveyor.

If no packets are present on the upstream conveyor, the unloading sequence will be repeated until the "empty" micro-switch (on line 188) closes, disabling NAND-gate 186 so that pulses from the unload enable sensor 184 can no longer reach the unload cycle control circuit.

The main components of the control circuit may for example be as follows:

| | |
|---|---|
| Dual Monostable Multivibrator (111, 160, 128, 196) | MC 14528 |
| Dual "D" Type Flip-Flop (109) | MC 14013 |
| Hex Buffer Inverters | MC 14049 |
| Quad 2-input NAND-gates | MC 14011 |
| Triple 3-input NAND-gate | MC 14023 |
| Dual 4-input NAND-gates | MC 14012 |
| Operational amplifiers | Motorola 14458 |
| Darlington amplifiers (gate power drivers) | Sprague ULN 2003 |
| Infra-red sensors (101, 103, 120, 178, 236, 122, 184, 200) | Visulux ML4-Ga |
| "Row Empty" sensor (216) | Visilux LS1-Ga |

We claim:

1. Packet handling apparatus including a conveyor for moving packets in line; a transfer region along the conveyor, said conveyor having separately-drivable sections respectively in said transfer region and downstream of said transfer region; a reversible accumulator arranged to receive batches of packets from or return batches to the conveyor in the transfer region; gate means at or near the exit from the transfer region; including a gate movable into an operative position to stop packets on the conveyor when it is required to transfer a batch from the conveyor to the accumulator; and means for increasing the spacing between packets on the conveyor to allow the gate to be inserted in a line of packets, said means including means for temporarily causing said downstream section of the conveyor to run faster than said upstream section.

2. Packet handling apparatus as claimed in claim 1, wherein said upstream section of the conveyor is of substantially the same length as said transfer region and is coincident therewith.

3. Packet handling apparatus including a conveyor for moving packets in line; a transfer region along the conveyor; a reversible accumulator arranged to receive batches of packets from or return batches to the conveyor in the transfer region, including a gate movable into an operative position to stop packets on the conveyor when it is required to transfer a batch from the conveyor to the accumulator; and means for increasing the spacing between packets on the conveyor to allow the gate to be inserted in a line of packets, said means including separately-drivable adjacent upstream and downstream sections of said conveyor and means for temporarily causing the downstream section to run faster than the upstream section comprising means for disconnecting drive to the upstream section so that the latter runs more slowly or stops.

4. Packet handling apparatus as claimed in claim 3, including a further conveyor section upstream of said upstream section and means for continuously driving said downstream section and said further section at the same speed.

5. Packet handling apparatus including a conveyor for moving packets in line; a transfer region along the conveyor; a reversible accumulator arranged to receive batches of packets from or return batches to the conveyor in the transfer region, including a gate movable into an operative position to stop packets on the conveyor when it is required to transfer a batch from the conveyor to the accumulator; means for increasing the spacing between packets on the conveyor to allow the gate to be inserted in a line of packets, said means comprising separately-drivable adjacent upstream and downstream sections of said conveyor and means for temporarily causing the downstream section to run faster than the upstream section; and sensor means for detecting whether a gap is present between packets to allow entry of said gate into its operative position and arranged to cause the temporary speed differential between said conveyor sections to cease on detection of said gap.

6. Packet handling apparatus as claimed in claim 5, wherein said sensor means is arranged to operate said gate after detection of a gap.

* * * * *